Patented May 9, 1939

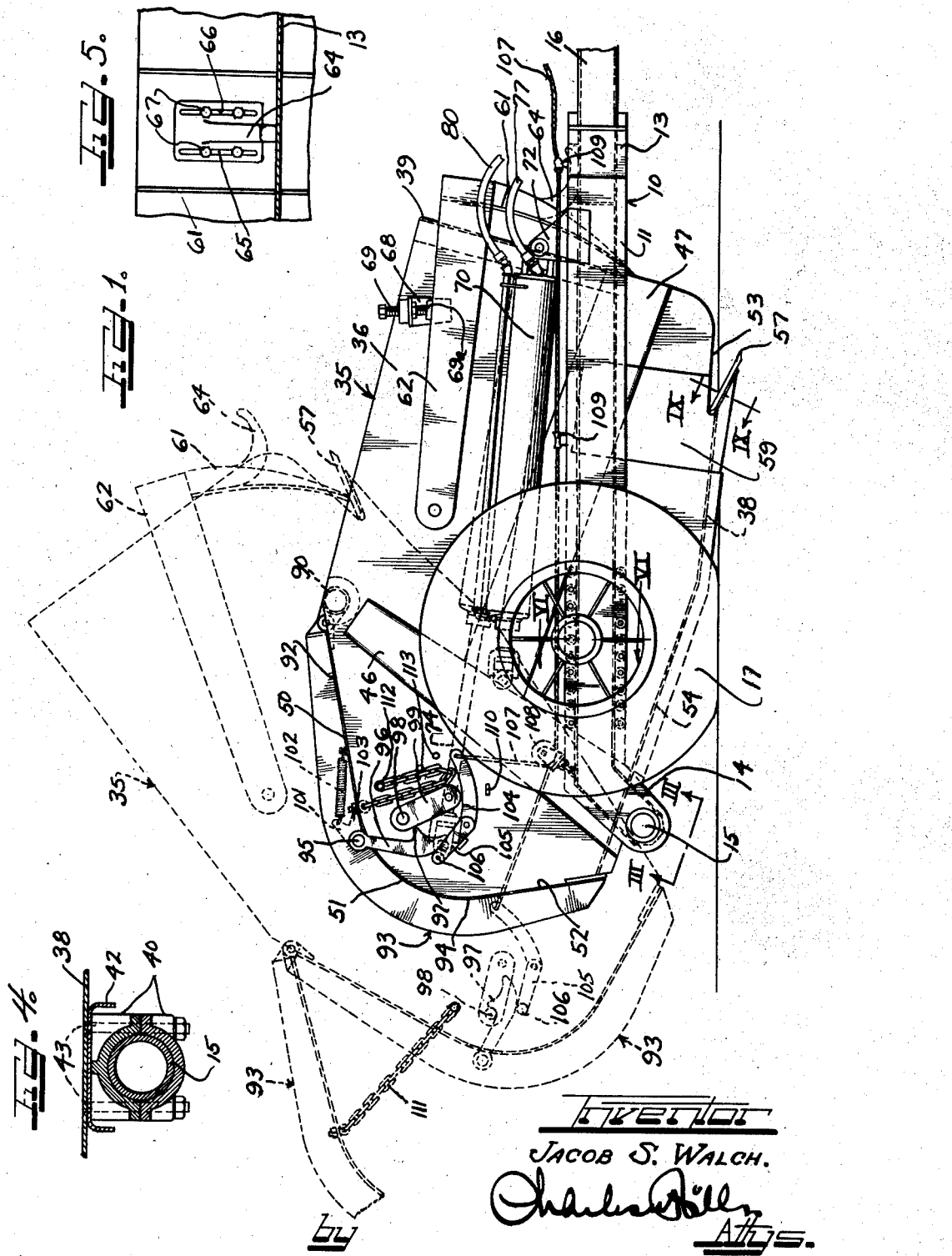

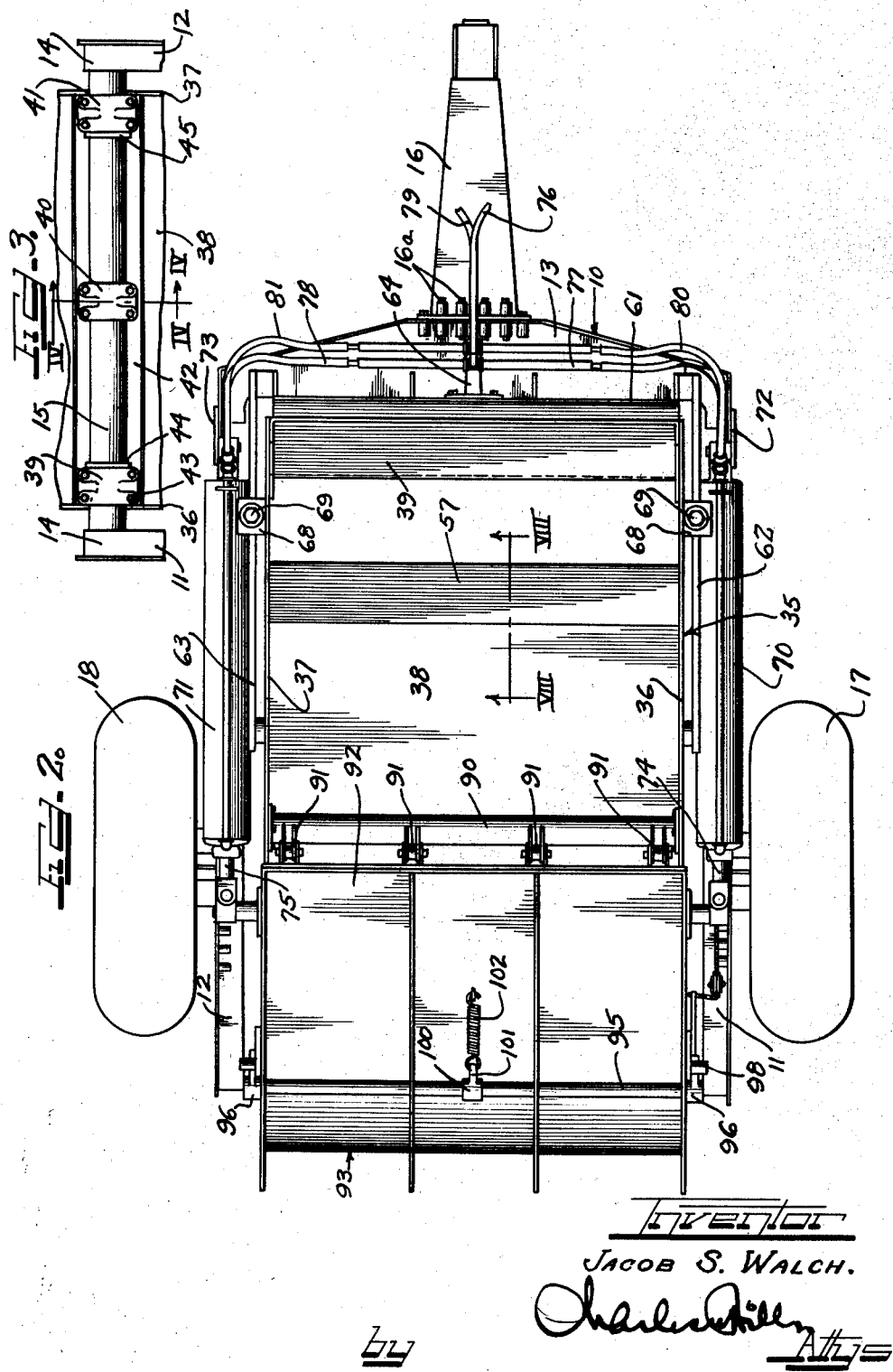

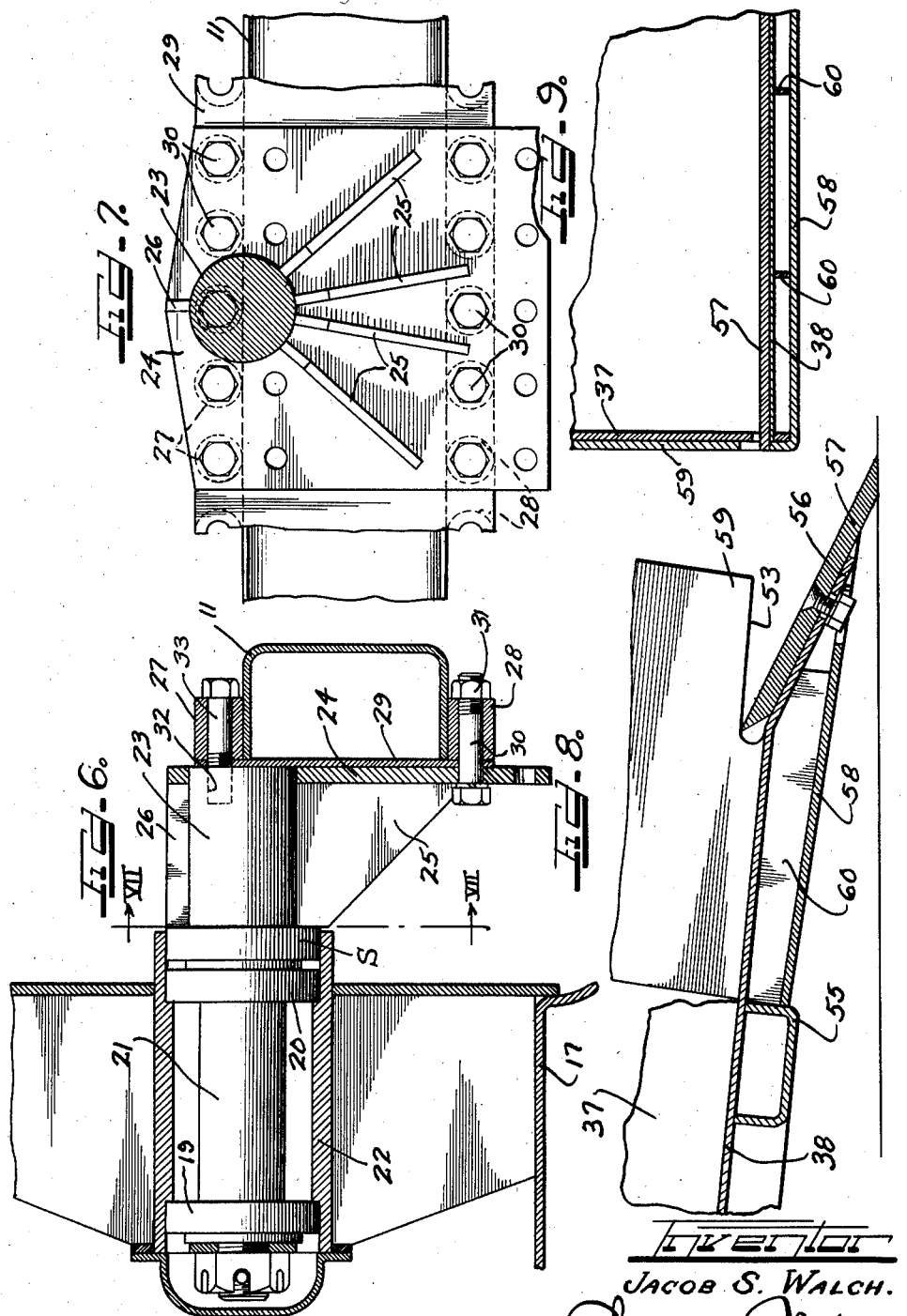

2,157,311

UNITED STATES PATENT OFFICE 2,157,311

SCRAPER

Jacob S. Walch, Springfield, Ill., assignor to Baker Manufacturing Co., Springfield, Ill., a corporation of Illinois Application March 13, 1937, Serial No. 130,655

14 Claims. (Cl. 37—133)

This invention relates to wagon scrapers adapted to be connected to and drawn by a prime mover such as a tractor.

More specifically, this invention relates to two wheeled scrapers having elongated dirt receiving bowls open at both ends with the front ends carrying a scraper blade and the rear ends adapted to be closed by a gravity operating gate.

The scrapers of this invention include a rigid frame structure comprising side beams supported from the ground on wheels and having downturned end portions. A shaft is rigidly secured at its ends to the bottoms of the downturned portions of the side beams and extends between the beams. A scraping bowl is disposed between the side beams and has the bottom thereof pivotally supported on the shaft. The scraping bowl has a length considerably greater than its width so that the back of the bowl is spaced considerably from the front cutting edge carried at the front of the bowl. An L-shaped gate is pivotally mounted to the top of the bowl for closing the rear end thereof and is closed by its own weight whenever the bowl is disposed in scraping or load carrying positions. However, when the bowl is tilted upwardly into dumping position, the gate swings open by gravity to permit discharge of the load from the bowl through the rear end thereof. If it is desired to maintain the gate in closed position even when the bowl is tilted upwardly to a dumping position, latching means can be utilized to hold the gate against the rear end of the bowl.

It is highly desirable in scrapers of this type to be able to load the scraping bowl to capacity so as to eliminate several trips to the dumping ground for transporting loads which, due to the capacity of the bowl, could be carried in one trip.

The provision of a long, narrow bowl, according to this invention, makes possible a tilting of the bowl to throw the load into the back end thereof without moving the scraper from the scraping ground. One or more of such tilting operations on the scraping ground insures a filling of the bowl to capacity, thereby eliminating several trips to the dumping ground.

A serious drawback to all heretofore known scrapers is the difficulty in obtaining a "pay" load into the bowl by a scraping action. Extra wide scraping bowls have been designed to receive a "pay" load. However, as the bowl is widened, the scraper blade is also widened and takes a wider cut. This requires additional traction power to pull the scraper.

The scraper bowls of this invention, on the other hand, are made long and narrow and have as great or even greater load capacity than the heretofore proposed wide bowls. At the same time, since the scraping blade is not widened, the scraper can be operated without the added traction power required on the wide type scrapers.

By having the rear ends of the bowls spaced considerably from the scraping edge, the material scraped into the bowls can be moved to the back end thereof by the tilting operation described above. This material will stay at the back end so that when the scraping operation is resumed, the new material entering the scraper does not have to push the previously received material backward into the bowl. This also lessens the traction power required for operation of the scraper.

A feature of this invention is the provision of horizontally and/or vertically adjustable wheels or crawler tracks on the frame structure of the scraper to obtain a desired amount of clearance for the rear end of the bowl such as is desired when the load in the bowl is dumped over embankments and the like or to raise the bowl from the ground as when working in sandy or wet light soil.

The scraper bowl is preferably closed at the top of the front end thereof by a plate rigidly affixed to the bowl. If desired, a front end gate can operate to close the open space beneath this plate during carrying and load dumping operations. The gate is adapted to rest on the frame structure during scraping operations and means can be provided cooperating with the gate structure for regulating the depth of the cut to be taken by the scraper blade.

It is then an object of this invention to provide a wheeled scraper having a long, narrow scraping bowl.

A further object of this invention is to provide a dirt scraping and dirt carrying apparatus adapted to be drawn by a prime mover such as a tractor and operated entirely by fluid pressure means controllable from the tractor.

A further object of this invention is to provide a wagon scraper having the wheels thereof adjustably mounted ahead of the dump end of the scraper.

A further object of this invention is to provide a rear end gate for two-wheeled wagon scrapers which is pivoted to the scraper bowl and, because of the position of the pivot, remains closed by gravity until the bowl is tilted to dumping position.

Another object of this invention is to provide a two-wheeled wagon scraper having an elongated scraping bowl adapted to carry increased quantities of material without widening the scraping edge, and thereby making possible an operation of the scraper with a minimum amount of traction power.

Another object of this invention is to provide a scraper having fluid pressure means for lowering the scraper bowl into scraping position, for tilting the bowl to throw material received in the bowl to the back end thereof, and for dumping the material from the bowl.

Another object of this invention is to provide a gravity operated rear end gate for scraper bowls that does not need to be locked during the scraping and load carrying operations of the scraper.

A further object of this invention is to provide a simple, rear end gate latching means for maintaining the gate in a closed position when it is desired to tilt the scraper bowl for throwing the load therein to the rear end of the bowl without dumping the load.

A further object of this invention is to provide an L-shaped gate for the rear end of wagon scraper bowls that is pivoted to the bowl at the top thereof in spaced relation from the rear end.

Other and further objects of this invention will become apparent to those skilled in the art from the following detailed description of the annexed sheets of drawings which disclose a preferred embodiment of the invention.

On the drawings:

Figure 1 is a side elevational view of a wagon scraper according to this invention, with a part of the tongue broken away, and showing, in full lines, the position of the scraper bowl and rear end gate therefor in scraping position and showing, in dotted lines, the position of the scraper bowl and the locked position of the rear end gate therefor when tilted to throw material received in the bowl into the back end thereof as well as the open position of the gate for dumping.

Figure 2 is a top plan view of the scraper shown in Figure 1.

Figure 3 is a fragmentary bottom plan view taken along the line III—III of Figure 1.

Figure 4 is a vertical cross-sectional view taken along the line IV—IV of Figure 3.

Figure 5 is a fragmentary front view of the front end gate support.

Figure 6 is a vertical cross-sectional view, with parts shown in elevation, taken substantially along the line VI—VI of Figure 1.

Figure 7 is a fragmentary cross-sectional view, with parts shown in elevation, taken along the line VII—VII of Figure 6.

Figure 8 is a vertical cross-sectional view, taken substantially along the line VIII—VIII of Figure 2 but with the side plate of the scraper bowl broken away.

Figure 9 is a vertical cross-sectional view, taken substantially along the line IX—IX of Figure 1.

As shown on the drawings:

In Figures 1 and 2, the reference numeral 10 designates generally the frame structure for the scraper. This frame structure comprises a pair of side beams 11 and 12 in spaced parallel relation rigidly connected at their front ends to a cross beam or yoke 13. The side beams 11 and 12 are turned down at their rear ends as shown at 14 in Figure 1. A shaft 15, best shown in Figure 3, is rigidly secured at its ends in the bottoms of the turned down portions 14 of the beams 11 and 12. The shaft 15 extends between the beams as shown in Figure 3.

The cross beam or yoke member 13, as best shown in Figure 2, has a tongue member 16 bolted to the center thereof by means of bolts 16a. The front end of the tongue 16 is provided with a coupler for joining the tongue with a prime mover such as a tractor. Wheels 17 and 18 support the frame structure 10 from the ground. If desired, tracks of the crawler type can be used in place of wheels.

As best shown in Figures 6 and 7, the wheels are freely rotatable on anti-friction bearings such as 19 and 20 disposed around an axle 21 extending into the hub 22 of the wheel 17. The axle 21 has an integral portion 23 thereof extending from the hub 22 of the wheel toward the side beam 11. This portion 23 is integral with a vertical plate 24 of greater width than the side beam 11. The plate 24 has two or more rows of bolt receiving holes along the top and two or more rows of said holes along the bottom thereof. Webs or fins 25, integral with the plate 24 and the portion 23 of the axle, support and rigidify the axle structure with the plate 24. A web or fin 26 can also extend from the top of the plate 24 along the axle portion 23, integral with the plate and axle.

A seal S is disposed in the end of the hub 22 of the wheel 17 to prevent ingress of dirt and loss of lubricant from the hub.

A plurality of bosses 27 are welded to the top of the side beam 11 between the downturned portion 14 thereof and the front end thereof. A plurality of bosses 28 are likewise welded to the bottom of the side beam 11 underneath the bosses 27. A plate 29 having a plurality of openings therethrough in alignment with the openings through the bosses 27 and 28 is welded to the frame 11 and to the bosses to form a rigid structure integral with the side beam.

As shown in Figures 6 and 7, the plate 24 is placed against the plate 29 so that the top row of holes and the row of holes above the bottom row therein are aligned with the holes in the plates 24. Bolts 30 are inserted through the holes in the plates 24 and 29 and through the bosses 27 and 28. Nuts 31 secure the bolts in position and rigidly hold the axle structure on the beam. Since the portion 23 of the axle may be disposed in front of one of the bosses 27 thereby preventing the insertion of a bolt such as 30, the end of the axle portion 23 may be tapped and threaded as at 32 (Figure 6) for receiving in threaded engagement therewith a bolt 33 inserted from the beam side of the structure.

This axle mounting structure permits a positioning of the axle at any desired point along a side beam of the frame structure. It should be understood that the axle structure is duplicated on the side beam 12. Thus when it is desired to move the wheels 17 and 18 toward the front end of the frame or toward the rear end of the frame, the bolts 30 and 33 may be disengaged and the plates 24 of the axle structures placed in alignment with a new set of bolt receiving bosses on the side beams. The wheels can thus be adjusted longitudinally along the side beams 11 and 12 to any position desired.

If it is desired to mount the side beams closer to the ground, the plate 24 is merely aligned on the plate 29 so that the bottom row of holes and the second row of holes therein register with the holes in plate 24. If a higher mounting than that shown in Figures 6 and 7 is desired the plate 24 may be rotated to place the bottom rows of holes at the top thereof. Since the axle portion 23 is off-center on the plate 24, being shown as closer to the top of the plate, this rotation of the plate lowers the axle and this raises the beams.

A scraper bowl 35 is mounted between the side beams 11 and 12 back of the cross beam 13. The bowl 35 comprises side plates 36 and 37, a bottom plate 38 and a front plate 39 secured to the front ends of the side plates 36 and 37 but spaced from the bottom plate 38.

As best shown in Figures 3 and 4, the bottom plate 38 is swivelly mounted on the shaft 15 of the frame structure by means of split bearing straps 39, 40 and 41. A reinforcing beam 42 is disposed between the bearing straps and the bottom 38 of the bowl. Bolts 43 extend through the bottom plate 38, the reinforcing member 42 and the strap members to rigidly connect the straps to the bowl and to hold the straps around the shaft 15.

Collars 44 and 45 or other abutment members are rigidly or integrally secured to the shaft 15 adjacent the bearings 39 and 41 on the inner sides of these bearings for holding the straps against longitudinal movement on the shaft 15. The bowl is thus disposed and held in spaced relation from the beams 11 and 12.

Rigidifying members 46 and 47 can be welded to the side plates 36 and 37 for resisting torsional strains to which the bowl 35 may be subjected.

As best shown in Figure 1, the side plates of the bowl 35 have their top edges sloping downwardly at the rear end of the bowl as shown at 50. The sloping portion 50 of the side plates is rounded as at 51 and the rounded portion 51 symmetrically curves into the rear end or substantially vertical portion 52 of the plates.

The front ends of the plates 36 and 37 are cut back at the bottom thereof as at 53 (Figure 1). The bottom 38 of the bowl extends only up to this cut back portion 53, and extends straight back from this portion to a point intermediate the ends of the bowl where it is bent upwardly to form a sloping portion 54 extending to the rear portion 52 of the side plates 36 and 37.

As shown in Figure 8 a reinforcing channel beam 55 may be mounted under the bottom plate 38 near the front end thereof.

As shown in Figures 8 and 9 the very front end of the bottom plate 38 is bent downwardly as at 56 (Figure 8) to form a bed for the scraper blade 57 which is bolted to the bottom of the scraper bowl. A reinforcing plate 58 is mounted under the bottom 38 and extends from the reinforcing beam 55 to the front end portion 56 of the bottom plate. This reinforcing plate has turned up side portions 59 rigidly secured to the side plates 36 and 37 of the bowl. Ribs 60 are disposed between the plate 58 and the bottom 38 of the bowl and may be welded into position. These ribs maintain the proper space between the bottom 38 and the plate 58 and rigidify the mounting for the blade 57. As shown in Figure 9 the ends of the scraper blade 57 are flush with the outer face of the upturned portion 59 of the reinforcing plate 58 so that the scraper blade extends through the opening provided by the cut back portion 53 of the side plates 36 and 37. The upturned portions 59 of the reinforcing plate 58 have similar cut back portions.

As shown in Figure 1, the upturned portions 59 of the reinforcing plate 58 can be welded to the stiffener or reinforcing member 47.

This construction provides a rigid bed for the scraper blade.

It has been pointed out above that the front plate 39 secured on the scraper bowl 35 is spaced from the bottom of the bowl. There is thus an open space at the front end of the bowl between the bottom of the front end plate 39 and the scraper blade 57. During load carrying positions of the bowl it is desirable to close this space for preventing loss of material therethrough. For this purpose a front end gate 61 may be provided. This gate is mounted in front of the scraper bowl and extends the full width of the bowl. The gate 61 has rearwardly extending arms 62 and 63 pivoted to the side plates 36 and 37 respectively of the bowl. The gate 61 carries a shoe 64 at the center thereof adapted to rest on the cross beam 13 of the frame structure (Fig. 5). This shoe 64 can be provided with vertical bolt receiving slots 65 and 66 for receiving bolts 67 therethrough extending through the gate at the mid-portion thereof to secure the shoe to the gate. The vertical slots 65 and 66 permit vertical adjustment of the shoe on the gate.

As best shown in Figure 1, when the bowl 35 is in scraping position the shoe 64 rests on the cross beam 13 of the frame 10 to hold the gate in spaced relation from the blade 57. The amount of opening between the scraper blade and the bottom of the gate 61 during scraping operation can be adjusted by vertical adjustment of the shoe 64. However, when the bowl 35 is raised to carrying position, the gate does not move upwardly with the bowl until the scraper blade 57 contacts the bottom of the gate. In this position of the bowl, therefore, the gate effectively closes the front end of the bowl and prevents loss of material during carrying position. As shown in dotted lines in Figure 1 the bottom of the gate 61 rests on the scraper blade 57 when the bowl is in tilted position, such as for dumping, or for throwing the load into the back end of the bowl.

The side plates 36 and 37 of the bowl 35 may carry brackets 68 supporting adjusting screws 69 for abutting stops 69a on the arms 62 and 63 of the gate member 61. The depth of cut taken by the scraper blade 57 can thus be nicely adjusted by the adjusting screws 69 since the shoe 64 of the gate 61 rests on the frame and the arms 62 and 63 of the gate cannot move any lower than the shoe 64 will permit. Thus the front end of the bowl can only be lowered until the adjusting screws 69 contact the stops 69a on the arms of the gate. It should be understood, however, that other types of stops or adjusting means can be used for regulating the depth of cut to be taken by the scraper blade 57.

Fluid pressure operated jacks 70 and 71 have the cylinders thereof pivoted to brackets 72 and 73 secured on the frame 10 near the front end thereof. The piston rods 74 and 75 of the jacks are pivoted to the sides of the scraper bowl 35 preferably on a reinforcing member 46 or 47 thereof at points intermediate the ends of the bowl.

As best shown in Figure 2, a fluid pressure line 76 extending from the prime mover for the scraper is connected through branch tubes 77 and 78 with the front ends of the cylinders 70 and 71 respectively. A second fluid pressure line 79 is connected through branch tubes 80 and 81 with the rear ends of the cylinders 70 and 71. Thus a valve can be conveniently located adjacent the driver's seat on the prime mover for the scraper to control the operation of the hydraulic jacks for raising and lowering the scraper bowl. Since the fluid on each side of the piston in either jack is in communication with the same side of the piston in the other jack, both sides of the scraper bowl are acted upon by the piston rods 74 and 75 with an equal amount of force and the jacks are simultaneously operated. The intercommunicating relationship of the jacks thus prevents a cocking or buckling of one side of the scraper bowl relative to the other side due to uneven forces applied to the sides.

A shaft or tube 90 is rigidly secured to the side plates 36 and 37 of the scraper bowl on the inside thereof, as best shown in Figure 2, at points adjacent the sloping portion 50 of the plates at the top of the bowl. The shaft 90 carries a plurality of hinges 91 for hingedly connecting the horizontal leg 92 of a rear end gate 93 for the bowl. The gate 93 is L-shaped and has a vertical leg 94 disposed over the rear end of the bowl. The horizontal leg 92 thereof is disposed over the top of the bowl. The edges of the gate 93 rest on the edges of the portions 50, 51 and 52 of the side plates 36 and 37.

Because of the forward position of the hinges 91 with respect to the vertical leg 94 of the gate 93, and with respect to the pivotal axis of the bowl 35 the gate remains closed by gravity during scraping and carrying positions of the bowl. Thus no latching means are needed for maintaining the gate in closed position during scraping and load carrying operations of the scraper. However, when it is desired to throw the load into the rear end of the bowl without dumping the load from the bowl, latching means must be provided to hold the gate in closed position. For this purpose, a rod 95 is rotatably mounted across the outside of the gate 93 and has the ends thereof projecting beyond the sides of the gate for receiving latches 96 thereon. The latches 96 have hooks 97 adapted to engage lugs 98 carried by strap members 99 secured to the side plates of the bowl. A boss member 100 is secured on the rod 95 at the center thereof and is provided with an arm 101 for receiving a spring 102 carried by the gate. A stop member 103 is also formed on the boss 100 and adapted to contact the gate 93 for arresting the rotation of the rod 95 caused by the spring 102. The spring 102 thus holds the latches 96 secured on the ends of the rod 95 out of engagement with the lugs 98.

The side plate 36 of the scraper bowl 35 has pivoted thereon, adjacent the latches 96, a link arm 104 provided with a bifurcated end 105 carrying between the furcations thereof a roller 106 adapted to ride on the latch 96.

A cable 107 is connected to the forward end of the arm 104, trained under a pulley 108 secured at the rear end of the side beam 11 and threaded through eyes 109 carried on the side beam to the prime mover for the scraper. When the operator desires to latch the rear end gate 93 of the scraper, the cable 107 is pulled to move the arm 104 downwardly against the stop member 110 formed on the side plate 36. The downward movement of this end of the link arm 104 moves the bifurcated end 105 thereof toward the lug 98 and the roller 106 carried in the bifurcated end urges the latch 96 against the pressure of the spring 102 so that its hook 97 engages the lug 98. Since the latch 96 on the other end of the rod 95 is moved by a rotation of the rod it also has the hook 97 thereof engage its lug 98 on the plate 37 of the scraper bowl. The cable 107 can be tied to hold the latches into locked position and the scraper bowl may be tilted as shown in dotted lines in Figure 1 by manipulation of the hydraulic jacks for throwing the load in the scraper bowl to the rear end of the bowl. Since the gate covers the top of the bowl at the rear end as well as the back of the bowl, the load can be thrown back by this tilting operation to completely fill the rear end of the bowl.

When scraping operations are to be resumed, the bowl is tilted back into scraping position shown in solid lines in Figure 1 and the cable may be released to permit an unlatching of the end gate locks. When the bowl is then filled with material scraped therein it can be raised to a carrying position so that the front end thereof is spaced from the ground and the material in the bowl can be transported to the dumping ground without latching the rear end gate since the same will remain closed. When the bowl is then tilted to dumping position the gate will swing open by gravity as shown in Figure 1 and permit a discharge of the load therefrom through the rear end thereof. Since the horizontal leg of the gate moves away from the top of the bowl during the dumping operation the material in the bowl can fall freely therefrom.

The gate itself can be used as a leveling means for the dumped material by connecting the gate to the bowl with a chain 111, or other holding means, so that the gate will drag behind the scraper in its opened position. The chain 111 can be secured to a side plate of the bowl on a pin or bolt 112 disposed in any one of a number of spaced holes 113 in the side plate. In this manner the amount which the gate is permitted to open can be regulated.

From the above descriptions it should be understood that this invention provides a greatly improved wheeled scraper construction capable of being operated entirely from the driver's seat on the prime mover for the scraper. Fluid pressure operated means controlled from the prime mover can be utilized to lower the scraping bowl to scraping position, to raise the bowl to a carrying position, to tilt the bowl beyond the carrying position for throwing material into the back end of the bowl and for dumping the material out of the back end of the bowl.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a wagon scraper, a main frame including spaced side beams, a bowl pivotally mounted on the frame between the side beams, means for tilting the bowl relative to the frame for dumping material collected therein out of the rear end of the bowl, wheels supporting the side beams from the ground at points forward of the rear end of the bowl, and means for selectively positioning said wheels along the side beams to vary the degree of projection of the rear end of the bowl beyond the wheels to accommodate variable dumping conditions out of the rear end of the bowl.

2. In a wagon scraper having rigid spaced opposed side frame beams and a bowl pivotally mounted between said side frame beams for vertical movement at its forward end, axles secured to said side frame beams intermediate the ends of the bowl, wheels rotatably mounted on said axles for supporting the side frame beams from the ground and means for selectively positioning said axles along the length of said side frame beams to vary the degree of projection of the rear end of the bowl beyond the axles.

3. A wagon scraper including a rigid frame structure pivotally supporting a scraper bowl, axle structures bolted to said frame structure, wheels rotatably mounted on said axle structures for carrying the frame structure in spaced relation from the ground, a plurality of bolt receiving means on said frame structure and bolt receiving means on said axle structures whereby said axle structures can be bolted at different positions on the frame to vary the distance of the wheels from the rear end of the frame and to vary the distance of the frame from the ground.

4. A scraper including a frame supported from the ground, a scoop pivoted on the frame for tilting movement relative thereto at its forward end, said scoop being open at its rear end, fluid pressure means for tilting the scoop relative to the frame, an end gate closing the rear end of the scoop during scraping and carrying positions of the scoop, said rear end gate being pivoted relative to the scoop at a point ahead of the pivotal axis of the scoop, a latch for locking the gate in closed position, spring means normally holding the latch in unlocked position, cable operated means cooperating with said latch for acting against the spring means to lock the latch whereby a tilting of the scoop from carrying to dumping position moves the pivotal axis of the gate back of the bowl pivot point whereby the gate will open by gravity for discharging a load out of the rear end of the scoop unless the cable operated means are actuated to lock the latch whereupon the load in the scoop will be moved toward the rear end of the scoop, without being discharged therefrom.

5. A wagon scraper comprising spaced opposed side frame members, a cross member connecting the front ends of the side frame members, a tongue member detachably secured to said cross member at the mid-portion of the member, said side frame members having downturned end portions, a shaft extending between the side frame members having the ends thereof rigidly secured to said downturned portions, a scraper bowl having the rear end portion mounted on top of said shaft, bearing members pivotally connecting the bowl around the shaft, a plurality of longitudinally spaced wheel support receiving means on said side frame members intermediate the ends thereof, and wheels carried by said support receiving means whereby said wheels can carry the frame from the ground and can be mounted at selected distances from the rear end of the bowl.

6. In combination, a frame structure having spaced opposed side beams, bolt receiving bosses secured to said side beams, plates having a plurality of bolt holes therethrough for alignment with said bosses, bolts extending through said bosses and through the bolt holes in said plates for rigidly joining the side beams and plates, stub-axles integrally united to said plates and extending outwardly therefrom and means integral with said plates and with said stub-axles for rigidifying the axles with the plates, whereby said axles can be disposed at selected positions along the length of said side beams.

7. A wagon scraper comprising a main frame having spaced opposed side beams, a bowl disposed between said side beams and pivoted thereon adjacent its bottom rear end, said bowl being open at the front and rear ends thereof, a plate disposed between the side walls of the bowl at the front end thereof in spaced relation from the bottom of the bowl for partially closing the front end of the bowl, a scraper blade carried at the front bottom end of the bowl, a front end gate disposed in front of the front plate of the bowl, arms extending rearwardly from said gate pivoted to the side walls of the bowl, a shoe carried by said gate for resting on said frame to hold the gate in spaced relation from the scraper blade when the bowl is in digging position, and means for tilting the bowl about its pivotal axis whereupon the scraper blade will be raised toward the bottom of the gate to close the space at the front end of the bowl beneath the front end plate of the bowl.

8. In a wheeled scraper, a frame structure, a scoop pivotally carried by said frame structure for movement in a vertical plane relative thereto, a front end gate for said scoop pivoted to the scoop, means adapted to thrust against the frame structure for supporting the gate in spaced relation from the ground and adjustable stops on said scoop for cooperation with the gate to control the distance which the front end of the scoop may be lowered.

9. A scraper comprising a frame structure having side frame beams, a bowl pivoted on said frame structure between the side frame beams for movement at its forward end, means for supporting said frame structure from the ground, axles rotatably carrying said means, plates secured to said axles having a plurality of horizontal rows of holes therein, said side frame beams having a plurality of bolt receiving means thereon, and bolts for connecting the plates with the side frame beams whereby said plates can be adjusted vertically on the beams by selection of the rows of holes therein for the bolts and said side frame beams can be adjustably spaced from the ground.

10. In a scraper, side frame beams, means for supporting the beams from the ground, axles rotatably carrying said means, plates secured to said axles having bolt holes therein, said axles being off-center on said plates, bolt receiving means on said side beams and bolts for securing the plates to the beams whereby a rotation of the plates will adjust the vertical positions of the axles to raise or lower the beams.

11. A wagon scraper comprising a frame structure including spaced side frame beams, a scraper bowl mounted between said side frame beams for movement in a vertical plane relative thereto, a front end gate for attachment to the scraper bowl, arms extending rearwardly from the gate, means pivotally connecting the arms with the bowl, means carried by the gate adapted to rest against the frame structure for holding the gate above the bottom of the bowl when the bowl is lowered to scraping position, and adjustable stops on said bowl for cooperation with the arms of the gate to control the distance which the front end of the bowl may be lowered beneath the bottom of the gate.

12. A wheeled scraper including a frame structure having spaced opposed side frame beams, a scraper bowl mounted between said side frame beams and carried by said frame for vertical movement at its forward end, axle structures adapted to be secured to said side frame beams, wheels rotatably mounted on said axle structures for carrying the frame structure in spaced relation from the ground, a plurality of axle structure mounting means along the length of said side frame beams and means securing the axle structures to the side frame beams whereby said wheels can be mounted at different positions along the frame to vary the distance of the wheels from the rear end of the frame.

13. A wheeled scraper comprising a frame structure having side frame beam members, a scraper bowl between said side frame beam members and carried by said frame structure for movement at its forward end, bolt receiving means carried by said side frame beam members, a pair of axle members, wheels rotatably carried by said axle members, bolt receiving means carried by said axle members, bolts cooperating with said bolt receiving means to secure an axle member on each side of the frame structure for supporting the side frame beam members from the ground and additional bolt receiving means in one of said members spaced vertically from the first mentioned bolt receiving means to effect vertical adjustment of said side frame beam members from the ground.

14. In a wagon scraper, a frame structure, a bowl pivotally carried by said frame structure, a front end gate for said bowl pivoted to the bowl, an adjustable device adapted to thrust against the frame structure for supporting the gate in spaced relation from the ground and an adjustable stop operatively functioning between the gate and bowl to control the distance that the front end of the bowl may be lowered.

JACOB S. WALCH.